(12) United States Patent
Pavlik

(10) Patent No.: US 9,107,387 B1
(45) Date of Patent: Aug. 18, 2015

(54) PORTABLE DOG PEN ASSEMBLY

(71) Applicant: Patty Pavlik, Cambridge, OH (US)

(72) Inventor: Patty Pavlik, Cambridge, OH (US)

( * ) Notice: Subject to any disclaimer, the term of this patent is extended or adjusted under 35 U.S.C. 154(b) by 95 days.

(21) Appl. No.: 13/919,412

(22) Filed: Jun. 17, 2013

(51) Int. Cl.
*A01K 1/02* (2006.01)
*A01K 1/03* (2006.01)
*A01K 1/00* (2006.01)

(52) U.S. Cl.
CPC ............ *A01K 1/034* (2013.01); *A01K 1/0035* (2013.01)

(58) Field of Classification Search
CPC . A01G 13/00; A01G 13/02; A01G 2013/002; A01G 2013/006; A01G 13/0225; A01K 3/00; A01K 1/0035; A01K 1/03; A01K 1/034; A01K 1/033; A01K 1/02; E04H 17/16; E04H 17/18; E04H 17/163; E04H 17/00; E04H 17/14; A47D 13/065; A47D 13/063; A47D 13/06; E01F 13/022; A47G 5/00; G03B 21/58
USPC ............ 119/502, 512, 513; 47/20.1, 29.6, 61, 47/31, 45; 256/12.5, 24, 25; 160/135, 351, 160/352
IPC ....... A01K 1/00, 3/00, 1/02, 1/03, 1/035; A01G 13/00, 13/02
See application file for complete search history.

(56) References Cited

U.S. PATENT DOCUMENTS

| | | | | |
|---|---|---|---|---|
| 2,709,073 A * | 5/1955 | Dougherty | .................. | 256/24 |
| 3,537,688 A * | 11/1970 | Stein | .................. | 135/95 |
| 3,579,908 A * | 5/1971 | Morgan | .................. | 47/45 |
| 4,576,364 A * | 3/1986 | O'Fearna | .................. | 256/24 |
| 4,645,183 A * | 2/1987 | Rattray et al. | .................. | 256/25 |
| 5,062,234 A * | 11/1991 | Green | .................. | 43/1 |
| 5,331,764 A * | 7/1994 | Sun | .................. | 47/45 |
| 5,718,414 A | 2/1998 | Deloach et al. | | |
| 5,865,355 A * | 2/1999 | Camara | .................. | 224/153 |
| 5,937,883 A * | 8/1999 | Camara | .................. | 135/87 |
| 6,092,792 A * | 7/2000 | Camara | .................. | 256/24 |
| 6,450,123 B1 | 9/2002 | Murray et al. | | |
| 6,457,438 B1 | 10/2002 | Baker | | |
| 6,553,940 B1 | 4/2003 | Powell et al. | | |
| 7,293,530 B2 | 11/2007 | Italiano | | |
| D614,815 S | 4/2010 | Co | | |
| 8,215,055 B2 * | 7/2012 | Miller | .................. | 47/31 |
| 2004/0112550 A1 * | 6/2004 | Green | .................. | 160/135 |
| 2005/0155284 A1 * | 7/2005 | Kulas | .................. | 47/31 |
| 2006/0060310 A1 * | 3/2006 | Haugen | .................. | 160/135 |
| 2006/0124912 A1 * | 6/2006 | Chavers | .................. | 256/1 |
| 2006/0236952 A1 | 10/2006 | King | | |
| 2011/0146187 A1 * | 6/2011 | Inman | .................. | 52/578 |
| 2011/0283611 A1 * | 11/2011 | Topping | .................. | 47/31 |

FOREIGN PATENT DOCUMENTS

GB 190920335 * 0/1910 ............. E04H 17/18

* cited by examiner

*Primary Examiner* — Kathleen Alker

(57) ABSTRACT

A portable dog pen assembly facilitates transport and temporary installation of an enclosure for an animal. The assembly includes a series of panels defining a sheet of material. Tubes are provided including medial tubes and end tubes. Each medial tube is positioned between an associated adjoined pair of the panels and each end tube is coupled to and extends along a free end of the sheet of material. Looped ends of stabilizer bars are alignable with a selectable one of the tubes to extend each stabilizer bar along a top edge of an associated one of the panels. Each of a plurality of posts is insertable through an associated one of the looped ends and the tubes and engages a ground surface such that the post extends upwardly from the ground surface. A connector couples the end tubes together such that the sheet of material forms an enclosure.

5 Claims, 5 Drawing Sheets

PORTABLE DOG PEN ASSEMBLY

BACKGROUND OF THE DISCLOSURE

Field of the Disclosure

The disclosure relates to pen devices and more particularly pertains to a new pen device for facilitating transport and temporary installation of an enclosure for an animal such as a dog.

SUMMARY OF THE DISCLOSURE

An embodiment of the disclosure meets the needs presented above by generally comprising panels coupled together in series defining a sheet of material. Tubes are provided including medial tubes and end tubes. Each medial tube is positioned between an associated adjoined pair of the panels and each end tube is coupled to and extends along a free end of the sheet of material. Looped ends of stabilizer bars are alignable with a selectable one of the tubes to extend each stabilizer bar along a top edge of an associated one of the panels. Each of a plurality of posts is insertable through an associated one of the looped ends and the tubes and engages a ground surface such that the post extends upwardly from the ground surface. A connector couples the end tubes together such that the sheet of material forms an enclosure.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
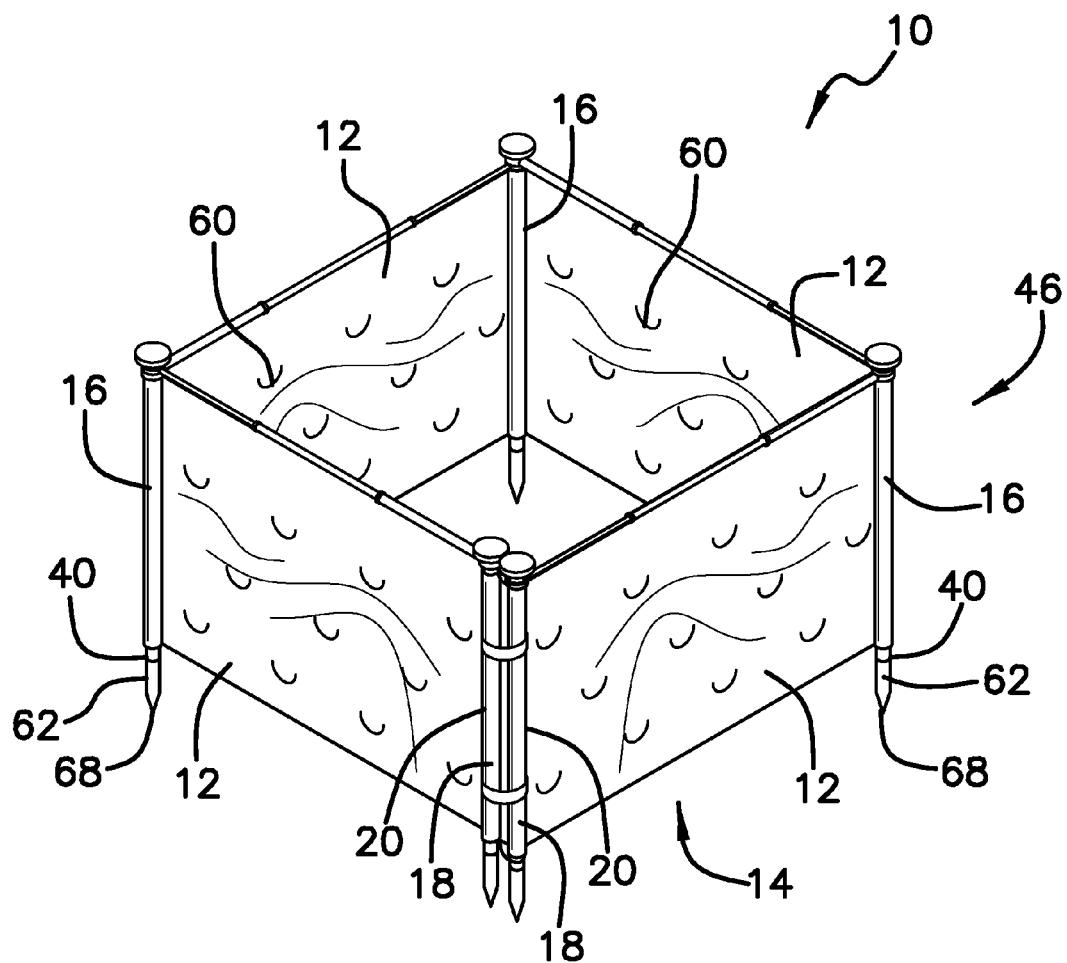
FIG. 1 is a top front side perspective view of a portable dog pen assembly according to an embodiment of the disclosure.
Figure 2:
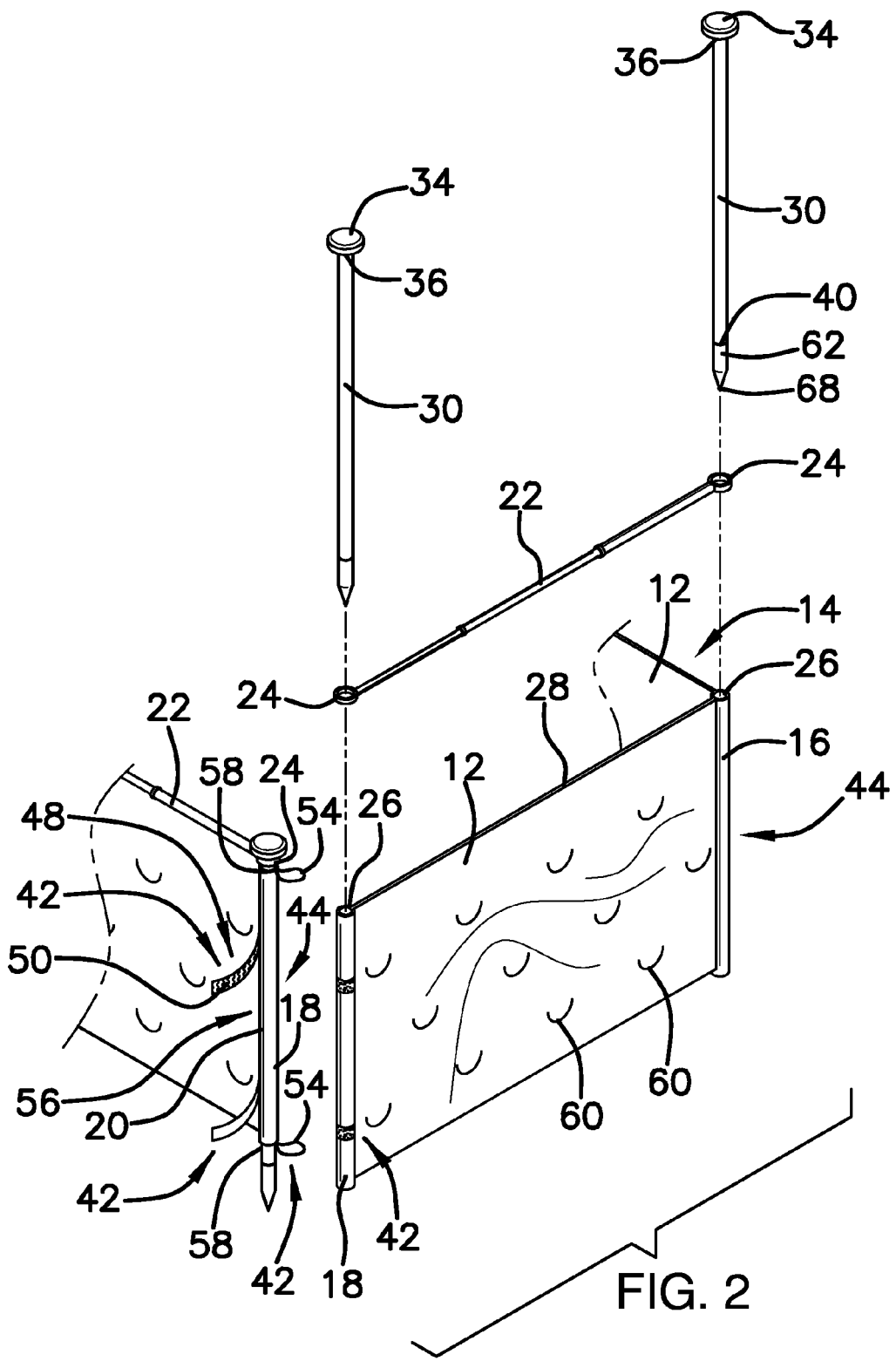
FIG. 2 is a partially exploded top front side perspective view of an embodiment of the disclosure.
Figure 3:
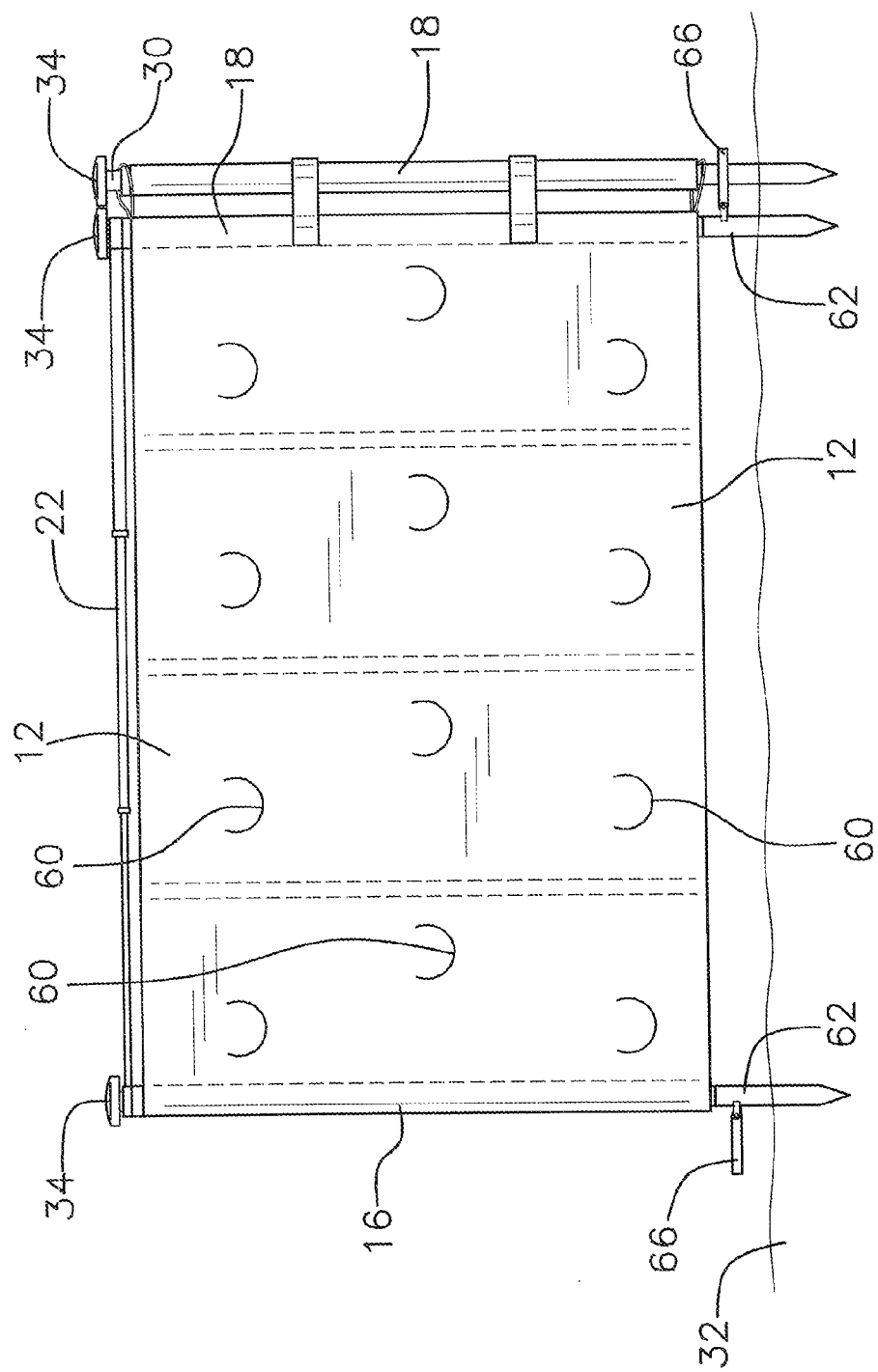
FIG. 3 is a front view of an embodiment of the disclosure.
Figure 4:
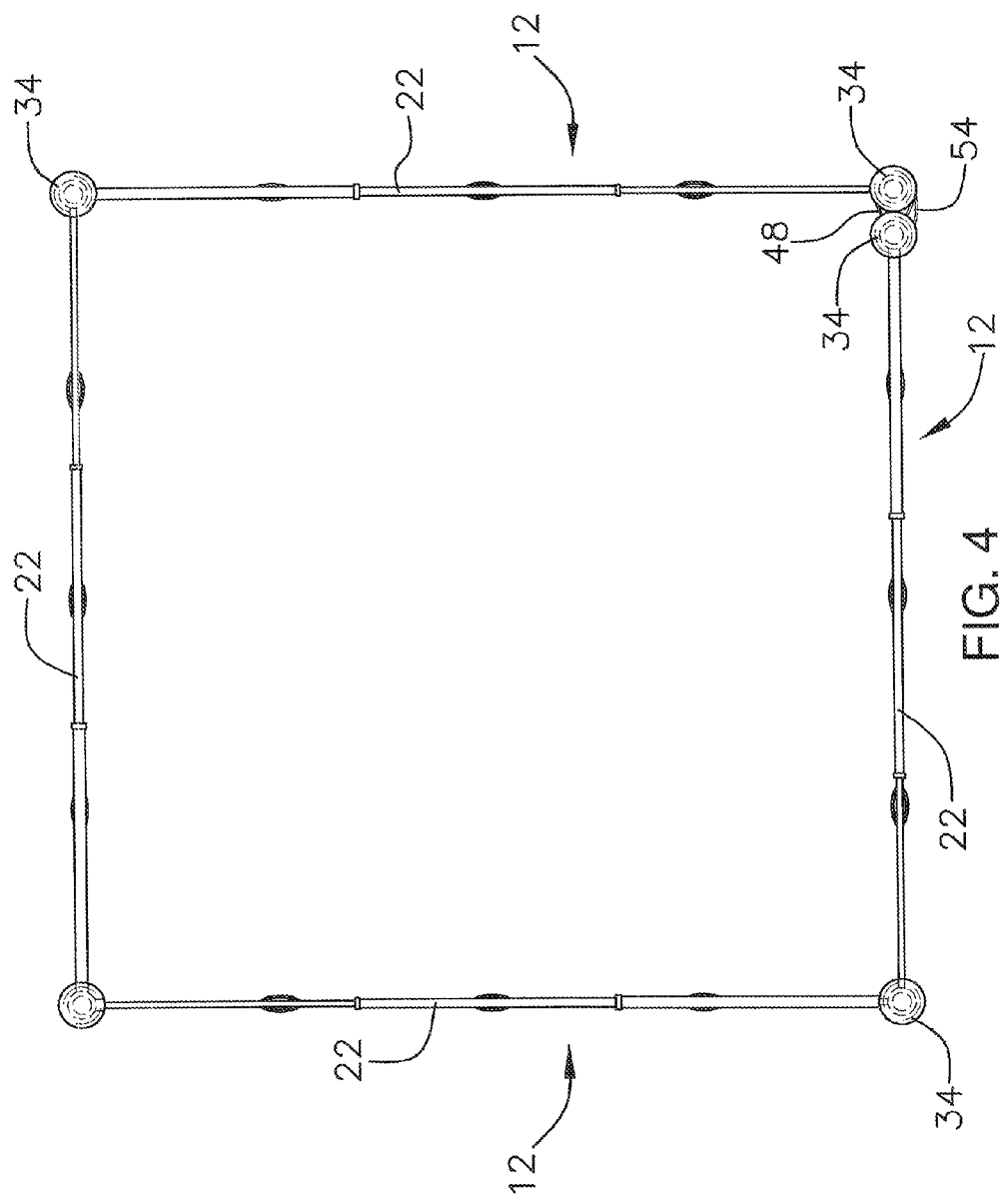
FIG. 4 is a top view of an embodiment of the disclosure.
Figure 5:
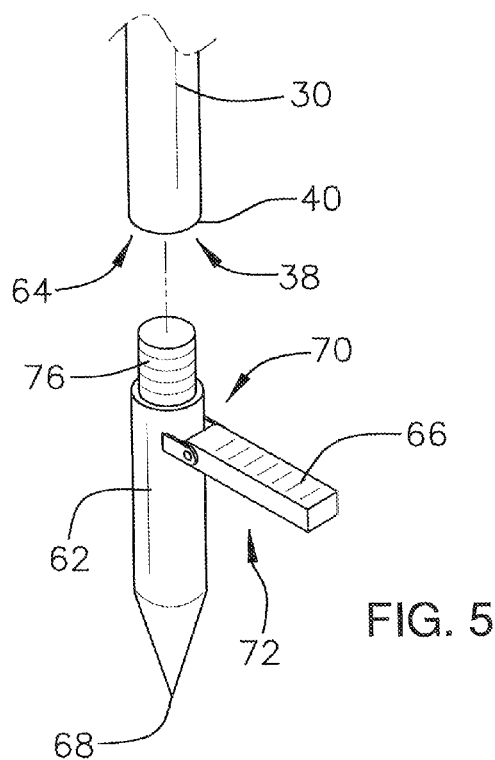
FIG. 5 is a top front side detailed view of foot and post of an embodiment of the disclosure.
Figure 6:
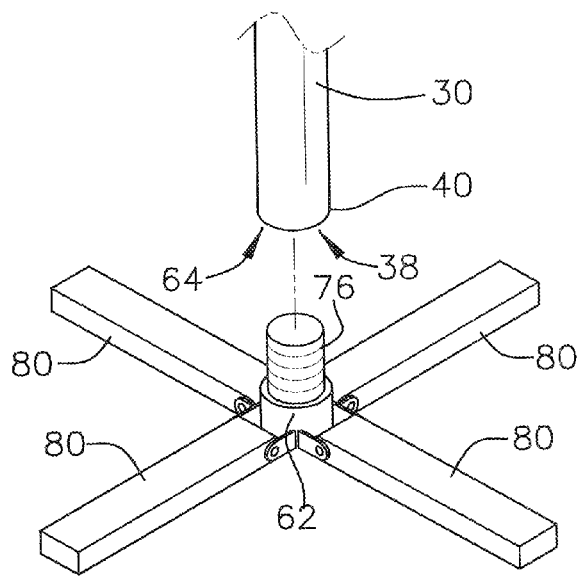
FIG. 6 is a top front side detailed view of a foot, post, and support legs of an embodiment of the disclosure.

With reference now to the drawings, and in particular to FIGS. 1 through 6 thereof, a new pen device embodying the principles and concepts of an embodiment of the disclosure and generally designated by the reference numeral 10 will be described.

As best illustrated in FIGS. 1 through 6, the portable dog pen assembly 10 generally comprises a plurality of panels 12. The panels 12 are coupled together in series defining a sheet of material 14. A plurality of tubes 44 includes medial tubes 16 and end tubes 18. Each of a plurality of medial tubes 16 is positioned between an associated adjoined pair of the panels 12. Each of a pair of end tubes 18 is coupled to and extends along a free end 20 of the sheet of material 14. Each of a plurality of stabilizer bars 22 has looped ends 24. Each of the looped ends 24 is alignable with a top end 26 of a selectable one of the tubes 44 wherein each stabilizer bar 22 is positionable to extend along a top edge 28 of an associated one of the panels 12. Each stabilizer bar 22 may be telescopic to reduce required storage space when the assembly 10 is not in use. Each of a plurality of posts 30 is insertable through an associated one of the looped ends 24 and the tubes 44. Each post 30 is configured for engaging a ground surface 32 such that the post 30 extends upwardly from the ground surface 32. Each post 30 may have a head portion 34 positioned at a top end 36 of the post 30 inhibiting the looped ends 24 from disengaging from the post 30. Each post 30 may also have a socket 38 positioned at a lower end 40 of the post 30.

A connector 42 couples the end tubes 18 together wherein the sheet of material 14 forms an enclosure 46. The connector 42 may comprise a strap 48 of hook and loop fastener 50. The connector 42 may also comprise a pair of loops 54 in combination with or alternative to the strap 48. Each loop 54 is coupled to and extends from an end edge 56 of the sheet of material 14. The loops 54 are alignable with opposite ends 58 of a selectable one of the tubes 44 wherein insertion of the associated post 30 through the loops 54 and the selected one of the tubes 44 forms the enclosure 46. A plurality of slits 60 may extend through the sheet of material 14 to permit air flow through the sheet of material 14.

A plurality of feet 62 may be provided. Each foot 62 is coupled to a bottom end 64 of an associated one of the posts 30. Each foot 62 is configured for engaging the ground surface 32. Each foot 62 may have a pointed lower end 68. Each foot 62 may further include a push support 66 pivotally coupled to the foot 62 proximate an upper end 70 of the foot 62. The push support 66 may extend outwardly from the foot 62 when the push support 66 is in an extended position 72 wherein the push support 66 is configured for facilitating insertion of the lower end 68 of the foot 62 into the ground surface 32 by stepping on the push support 66. Each foot 62 further has a connection portion 76 extending upwardly from an upper end 70 of the foot 62. The connection portion 76 of each foot 62 is insertable into the socket 38 of the associated post 30. Alternatively, each of a plurality of support legs 80 may be pivotally coupled to an associated one of the feet 62. The support legs 80 may be grouped into sets of legs 80 radially arranged to extend from an associated one of the feet 62. Thus, the support legs 80 are configured to support the associated post 30 without insertion into the ground surface 32.

In use, the posts 30 are inserted through the looped ends 24 and tubes 44 coupling the panels 12 to the posts 30. The posts 30 are arranged to form the enclosure 46 and supported upright relative to the ground surface 32 by the feet 62. The end tubes 18 are coupled together by the connector 42 to hold the enclosure 46 together during use.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable dog pen assembly comprising:
  a plurality of panels defining a sheet of material;
  a plurality of medial tubes, each medial tube being positioned between an associated adjoined pair of said panels;
  a pair of end tubes, each end tube being coupled to and extending along a free end of said sheet of material;
  a plurality of stabilizer bars, each stabilizer bar having looped ends, each of said looped ends being alignable with a top end of a selectable one of said tubes wherein each stabilizer bar is positionable to extend along a top edge of an associated one of said panels, each said stabilizer bar being telescopic;
  a plurality of posts, each post being insertable through an associated one of said looped ends and said tubes, each post being configured for engaging a ground surface wherein said post extends upwardly from said ground surface;
  a connector coupling said end tubes together wherein said sheet of material forms an enclosure;
  a plurality of slits extending through said sheet of material;
  a plurality of feet, each foot being coupled to a bottom end of an associated one of said posts, each foot being configured for engaging the ground surface, each said foot having a pointed lower end, each said foot having a push support pivotally coupled to said foot proximate an upper end of said foot, said push support extending outwardly from said foot when said push support is in an extended position wherein said push support is configured for facilitating insertion of said lower end of said foot into the ground surface by stepping on said push support;
  a plurality of support legs, each of said support legs being pivotally coupled to an associated one of said feet, said support legs being grouped into sets of legs, each set of legs being radially arranged to extend from an associated one of said feet;
  each foot having a connection portion extending upwardly from an upper end of said foot; and
  each said post having a socket positioned at said bottom end of said post, said connection portion of said foot being insertable into said socket of said associated post.

2. The assembly of claim 1, further comprising said connector being a strap of hook and loop fastener.

3. The assembly of claim 1, further comprising each said post having a head portion positioned at a top end of said post.

4. The assembly of claim 1, further comprising said connector being a pair of loops, each loop being coupled to and extending from said free end of said sheet of material, said loops being alignable with opposite ends of a selected one of said tubes wherein insertion of an associated one of said posts through said loops and said selected one of said tubes forms said enclosure.

5. A portable dog pen assembly comprising:
  a plurality of panels, said panels being coupled together in series defining a sheet of material;
  a plurality of medial tubes, each medial tube being positioned between an associated adjoined pair of said panels;
  a pair of end tubes, each end tube being coupled to and extending along a free end of said sheet of material;
  a plurality of stabilizer bars, each stabilizer bar having looped ends, each of said looped ends being alignable with a top end of a selectable one of said tubes wherein each stabilizer bar is positionable to extend along a top edge of an associated one of said panels, each said stabilizer bar being telescopic;
  a plurality of posts, each post being insertable through an associated one of said looped ends and said tubes, each post being configured for engaging a ground surface wherein said post extends upwardly from said ground surface, each said post having a head portion positioned at a top end of said post, each said post having a socket positioned at a bottom end of said post;
  a connector coupling said end tubes together wherein said sheet of material forms an enclosure, said connector comprising a strap of hook and loop fastener, said connector comprising a pair of loops, each loop being coupled to and extending from said free end of said sheet of material, said loops being alignable with opposite ends of a selected one of said tubes wherein insertion of an associated one of said posts through said loops and said selected one of said tubes forms said enclosure;
  a plurality of slits extending through said sheet of material;
  a plurality of feet, each foot being coupled to said bottom end of an associated one of said posts, each foot being configured for engaging the ground surface, each said foot having a pointed lower end, each said foot having a push support pivotally coupled to said foot proximate an upper end of said foot, said push support extending outwardly from said foot when said push support is in an extended position wherein said push support is configured for facilitating insertion of said lower end of said foot into the ground surface by stepping on said push support, each foot having a connection portion extending upwardly from an upper end of said foot, said connection portion of each said foot being insertable into said socket of said associated post; and
  a plurality of support legs, each of said support legs being pivotally coupled to an associated one of said feet, said support legs being grouped into sets of legs, each set of legs being radially arranged to extend from an associated one of said feet.

* * * * *